United States Patent
Park et al.

(10) Patent No.: US 11,114,898 B2
(45) Date of Patent: Sep. 7, 2021

(54) DEVICE AND METHOD FOR SUPPORTING IMPROVED COMMUNICATION SPEED IN WIRELESS POWER TRANSMISSION SYSTEM

(71) Applicant: LG Electronics Inc., Seoul (KR)

(72) Inventors: Yongcheol Park, Seoul (KR); Gyunghwan Yook, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/979,821

(22) PCT Filed: Mar. 7, 2019

(86) PCT No.: PCT/KR2019/002660
§ 371 (c)(1),
(2) Date: Sep. 10, 2020

(87) PCT Pub. No.: WO2019/177306
PCT Pub. Date: Sep. 19, 2019

(65) Prior Publication Data
US 2021/0044152 A1    Feb. 11, 2021

(30) Foreign Application Priority Data
Mar. 12, 2018    (KR) .................. 10-2018-0028827

(51) Int. Cl.
*H01F 27/42*    (2006.01)
*H01F 37/00*    (2006.01)
(Continued)

(52) U.S. Cl.
CPC .............. *H02J 50/20* (2016.02); *H02J 50/10* (2016.02); *H02J 50/40* (2016.02)

(58) Field of Classification Search
CPC . H02J 5/005; H02J 7/025; H02J 17/00; H01F 38/14; B60L 11/182
(Continued)

(56) References Cited

U.S. PATENT DOCUMENTS 9,225,568 B1    12/2015 Mei et al.
2010/0007307 A1*    1/2010 Baarman ................. H02J 50/80
                                                                        320/108
(Continued)

FOREIGN PATENT DOCUMENTS

KR    20150054802    5/2015
KR    20160012889    2/2016
(Continued)

*Primary Examiner* — Quan Tra
(74) *Attorney, Agent, or Firm* — Fish & Richardson P.C.

(57) ABSTRACT

The present invention relates to a device and method for supporting improved communication speed in a wireless power transmission system. The present specification provides a method comprising the steps of: generating wireless power at an operating frequency; configuring n, as the number of cycles per bit, which is used for transmitting one bit at the operating frequency; aligning each bit of the data with the n cycles; causing the operating frequency to transition between differential biphases according to the value of said each bit during the n cycles; and transmitting the wireless power to a wireless power receiving device on the basis of magnetic coupling at the transitioning operating frequency.

15 Claims, 21 Drawing Sheets

(51) Int. Cl.
  *H01F 38/00* (2006.01)
  *H02J 50/20* (2016.01)
  *H02J 50/10* (2016.01)
  *H02J 50/40* (2016.01)

(58) Field of Classification Search
  USPC .......................................................... 307/104
  See application file for complete search history.

(56) References Cited

U.S. PATENT DOCUMENTS

| | | | | |
|---|---|---|---|---|
| 2013/0026849 | A1* | 1/2013 | Ohta | G06F 1/12 307/104 |
| 2015/0008756 | A1* | 1/2015 | Lee | H02J 7/00034 307/104 |
| 2015/0108847 | A1* | 4/2015 | Taylor | H02J 5/005 307/104 |
| 2016/0118810 | A1* | 4/2016 | Park | H02J 7/0013 307/104 |

FOREIGN PATENT DOCUMENTS

| KR | 20160065866 | 6/2016 |
|---|---|---|
| KR | 20180002997 | 1/2018 |

* cited by examiner

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 15

PTx Capability packet(Header: 0x31)

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Maximum Power Value | | | | | |
| $B_1$ | Reserved | | Potential Power Value | | | | | |
| $B_2$ | Reserved | | | | | ML | WPID | Not Res Sens |

FIG. 16

PTx Capability packet(Header: 0x31)

| | b₇ | b₆ | b₅ | b₄ | b₃ | b₂ | b₁ | b₀ |
|---|---|---|---|---|---|---|---|---|
| B₀ | Power Class | | Maximum Power Value | | | | | |
| B₁ | Reserved | | Potential Power Value | | | | | |
| B₂ | Reserved | | | ML | | | WPID | Not Res Sens |

DEVICE AND METHOD FOR SUPPORTING IMPROVED COMMUNICATION SPEED IN WIRELESS POWER TRANSMISSION SYSTEM

CROSS-REFERENCE TO RELATED APPLICATIONS

This application is a National Stage application under 35 U.S.C. § 371 of International Application No. PCT/KR2019/002660, filed on Mar. 7, 2019, which claims the benefit of Korean Patent Application No. 10-2018-0028827, filed on Mar. 12, 2018. The disclosures of the prior applications are incorporated by reference in their entirety.

TECHNICAL FIELD

The present disclosure relates to wireless charging, and more particularly, to an apparatus and method for supporting an improved communication speed in a wireless power transmission system.

BACKGROUND ART

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

In the wireless power transmission system, communication between a wireless power transmitter and receiver has been generally performed using amplitude shift keying (ASK) using a magnetic field change or frequency shift keying (FSK) using a frequency change. However, since a transfer rate of the ASK and the FSK is only a few kHz and is vulnerable to electrical and magnetic disturbances, the existing communication methods are not suitable for medium power transmission or large volume data transmission such as authentication, which is required in the advanced wireless power transmission system. Accordingly, in order to cover various applications of the wireless power transmission, there is a need for a wireless power transmitter, a receiver, and a method for supporting an improved communication speed.

DISCLOSURE

Technical Problem

The technical problem of the present disclosure is to provide an apparatus and method for supporting an improved communication speed in a wireless power transmission system.

The technical problem of the present disclosure is to provide a wireless power transmitter and a wireless power transmitting method that transmits FSK data and transmits wireless power based on various frequency shift keying (FSK) modulation levels.

The technical problem of the present disclosure is to provide a wireless power receiver and a wireless power receiving method for receiving SFK data and receiving wireless power based on various FSK modulation levels.

The technical problem of the present disclosure is to provide a packet structure and procedure for supporting various FSK modulation levels.

Technical Solution

According to an aspect of the disclosure, there is provided a method for transmitting data and wireless power by a wireless power transmitter. The method includes: generating the wireless power at an operating frequency; setting the number n of cycles per bit used to transmit one bit at the operating frequency; aligning each bit of the data to the n cycles; transitioning the operating frequency between differential bi-phases depending on values of each bit for the n cycles; and transmitting the wireless power to a wireless power receiver based on magnetic coupling at the transitioned operating frequency. The number of cycles per unit bit may be variably set based on a modulation level.

When the modulation level increases, the number of cycles per unit bit may decrease.

The number of cycles per unit bit or the modulation level may be set in a negotiation phase related to the transmission of the wireless power.

The information on the modulation level may be included in a capability packet of the wireless power transmitter and transmitted to the wireless power receiver.

The capability packet of the wireless power transmitter may be transmitted as a response to a request packet of the wireless power receiver.

The request packet of the wireless power receiver may include information on a modulation level selected by the wireless power receiver.

The modulation level or the number of cycles per unit bit may be defined as a default.

According to another aspect of the disclosure, there is provided a wireless power transmitter transmitting data and wireless power. The wireless power transmitter includes: a power conversion unit that generates the wireless power at an operating frequency and transmits the generated wireless power to a wireless power receiver based on magnetic coupling; and a communication/control unit that sets the number n of cycles per bit used to transmit one bit at the operating frequency, align each bit of the data to n cycles, and transitions the operating frequency between differential bi-phases depending on values of each bit for the n cycles.

The number of cycles per unit bit may be variably set based on a modulation level.

When the modulation level increases, the number of cycles per unit bit may decrease.

The number of cycles per unit bit or the modulation level may be set in a negotiation phase related to the transmission of the wireless power.

The communication/control unit may transmit information on the modulation level to the wireless power receiver by including the information on the modulation level in a capability packet of the wireless power transmitter.

The communication/control unit may transmit the capability packet of the wireless power transmitter as a response to a request packet of the wireless power receiver.

According to still another aspect of the disclosure, there is provided a wireless power receiver transmitting data and wireless power. The wireless power receiver includes: a power pick-up unit that receives the wireless power from a wireless power transmitter at an operating frequency; and a communication/control unit that detects n cycles aligning each bit at the operating frequency based on the number n of cycles per bit negotiated with the wireless power transmitter in advance, detects a transition phase of the operating frequency for the n cycles, and decodes data received from the wireless power transmitter based on the transition phase of the operating frequency.

Advantageous Effects

Various FSK modulation levels can be selected according to the communication channel quality or power class or phase between the wireless power transmitter and the receiver, thereby supporting various applications of the wireless power transmission. The FSK modulation scheme that changes the number of cycles per bit provides improved data transfer rate and flexibility in communication control compared to the FSK modulation scheme that operates a fixed number of cycles per bit.

DESCRIPTION OF DRAWINGS

FIG. 10 is a structure of a sync pattern according to an embodiment.

FIG. 15 is a diagram illustrating a structure of a PTx capability packet of a wireless power transmitter according to an embodiment.

FIG. 16 is a diagram illustrating a capability packet structure of a wireless power transmitter according to another embodiment.

MODE FOR DISCLOSURE

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
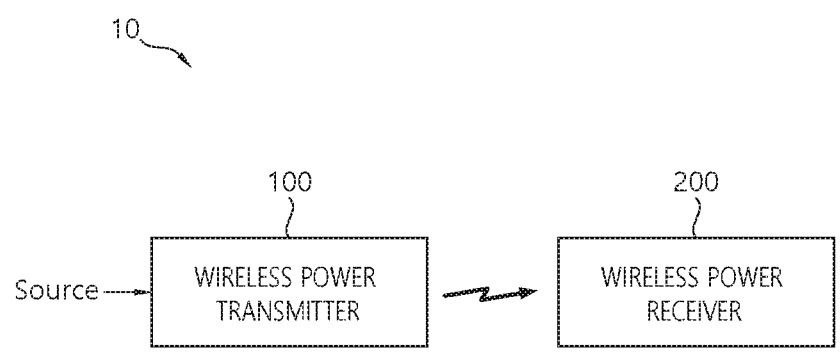
FIG. 1 is a block diagram of a wireless power system (10) according to an embodiment.

FIG. 1 is a block diagram of a wireless power system (10) according to an embodiment.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
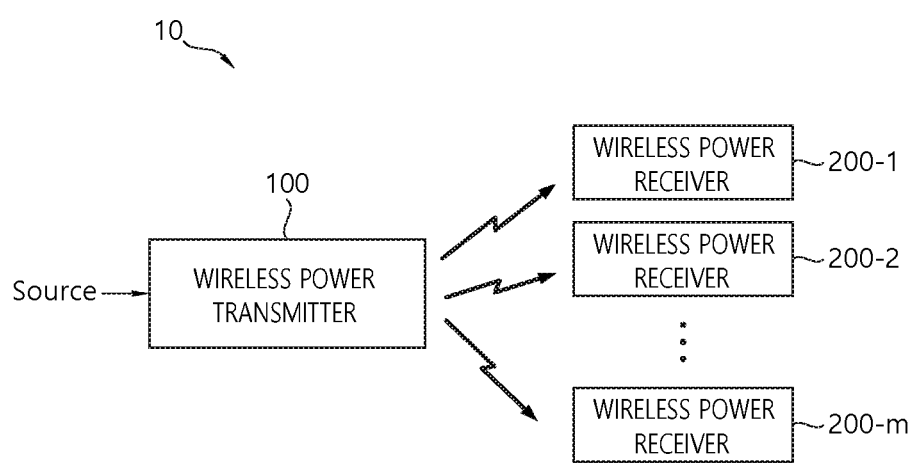
FIG. 2 is a block diagram of a wireless power system (10) according to another embodiment.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
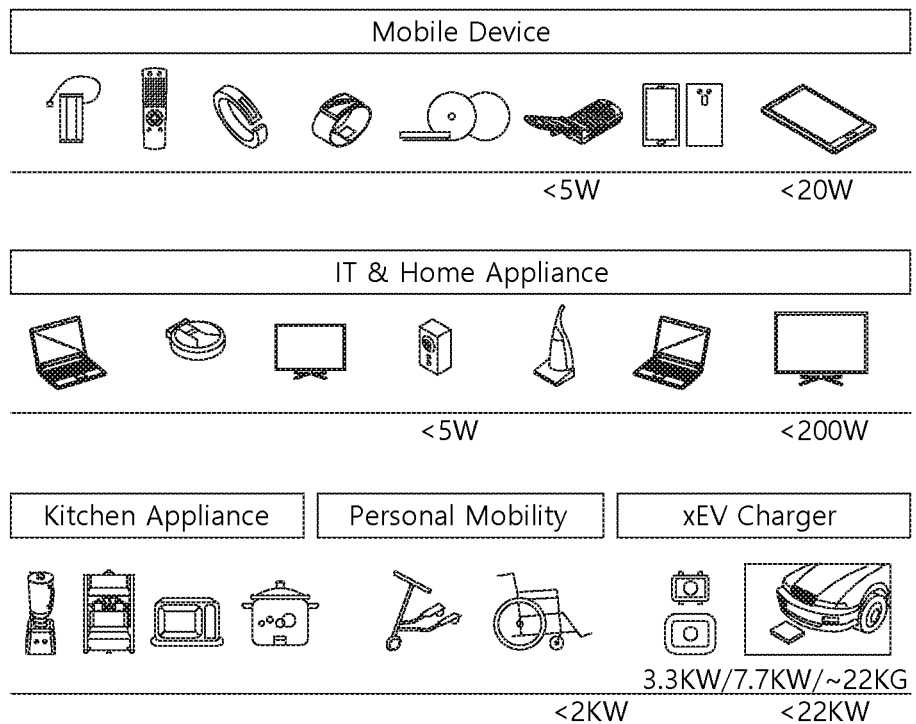
FIG. 3 shows an exemplary embodiment of diverse electronic devices adopting a wireless power transmission system.

FIG. 3 shows an exemplary embodiment of diverse electronic devices adopting a wireless power transmission system.

As shown in FIG. 3, the electronic devices included in the wireless power transmission system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the this specification will be described based on a mobile device adopting the wireless power charging method, this is merely exemplary. And, therefore, it shall be understood that the wireless charging method according to this specification may be applied to diverse electronic devices.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select" Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5W, and the EPP is related to a wireless power transmitter and a wireless power receiver supporting the transfer of a power range greater than 5W and less than 30W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OBB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transmission/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transmission/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Hereinafter, 'profiles' will be newly defined based on indexes/reference standards representing/indicating the compatibility. More specifically, it may be understood that by maintaining compatibility between wireless power transmitters and receivers having the same 'profile', stable power transmission/reception may be performed, and that power transmission/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as D3 and OOB communication, and the operation frequency may be defined as 87 to 205 kHz, and smart-phones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of a power tool and kitchen profile, NFC communication may be used between a wireless power transmitter and receiver. The wireless power transmitter and receiver may exchange a WPC NFC data exchange profile format (NDEF) to mutually confirm that they are NFC devices applied to WPC wireless power devices. For example, the WPC NDEF may include an application profile field (e.g., 1B), a version field (e.g., 1B), and profile specific data (e.g., 1B). The application profile field indicates to which one of: i) mobile and computing; ii) a power tool; and iii) a kitchen, a corresponding device belongs. An upper nibble of the version field indicates a major version, and a lower nibble indicates a minor version. In addition, the profile specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transmission only to the wireless power receiving corresponding to the same profile as the wireless power transmitter, thereby being capable of performing a more stable power transmission. Additionally, since the load (or burden) of the wireless power transmitter may be reduced and power transmission is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |

TABLE 1-continued

| | $P_{TX\_IN\_MAX}$ | Minimum category support requirement | Minimum value for a maximum number of supported devices |
|---|---|---|---|
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 4:
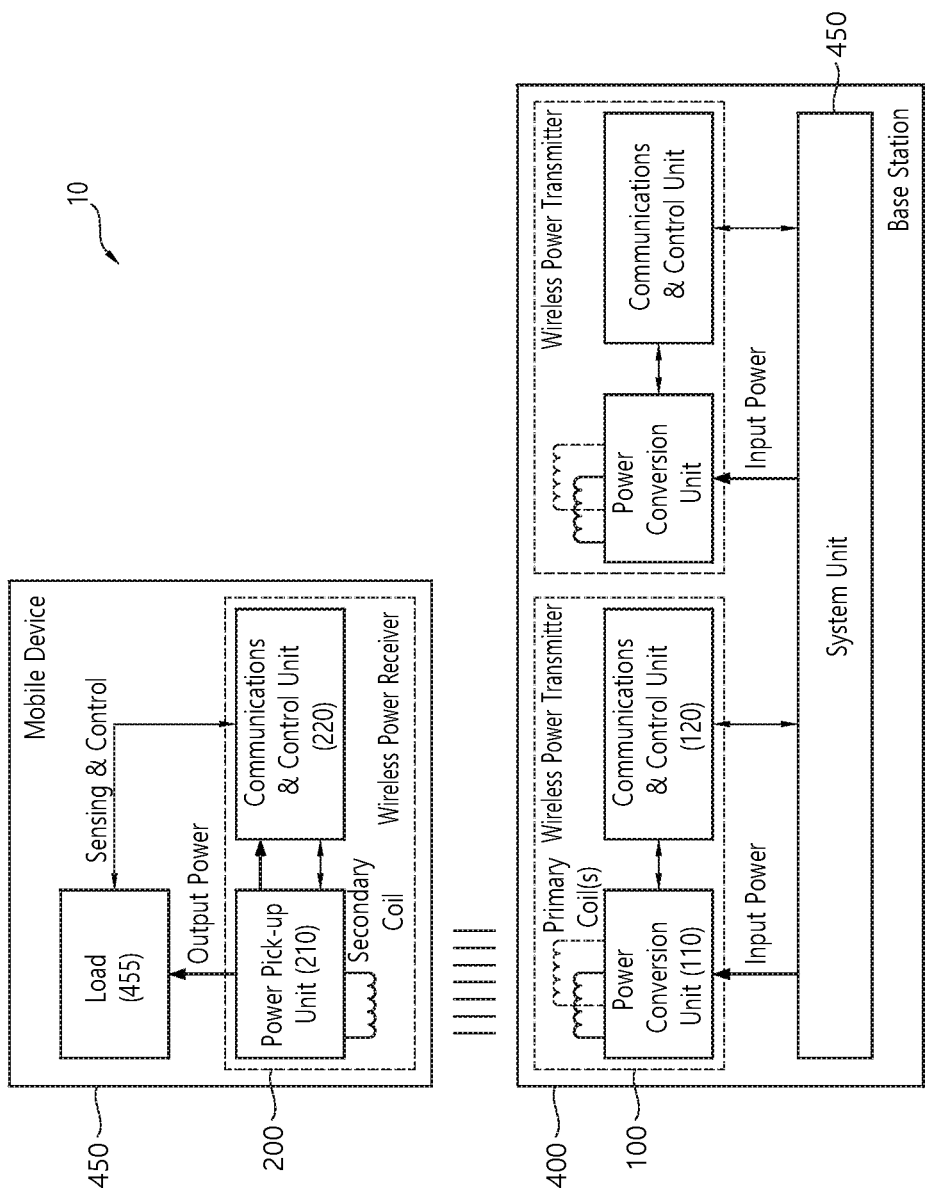
FIG. 4 is a block diagram of a wireless power transmission system according to another embodiment.

As shown in Table 1, a maximum output power capability of Class n PTU may be equal to or greater than the $O_{TX\_IN\_MAX}$ of the corresponding class. The PRU cannot draw a power that is higher than the power level specified in the corresponding category. FIG. 4 is a block diagram of a wireless power transmission system according to another embodiment.

Referring to FIG. 4, the wireless power transmission system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on. Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and/or receive information by using a magnetic wave, which uses a specific frequency as its center frequency. For example, the communications & control unit (120) may perform in-band (IB) communication by loading information in the magnetic wave and by transmitting the information through the primary coil or by receiving a magnetic wave carrying information through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operation point, the communications & control unit (120) may control the transmitted power. The operation point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that can execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
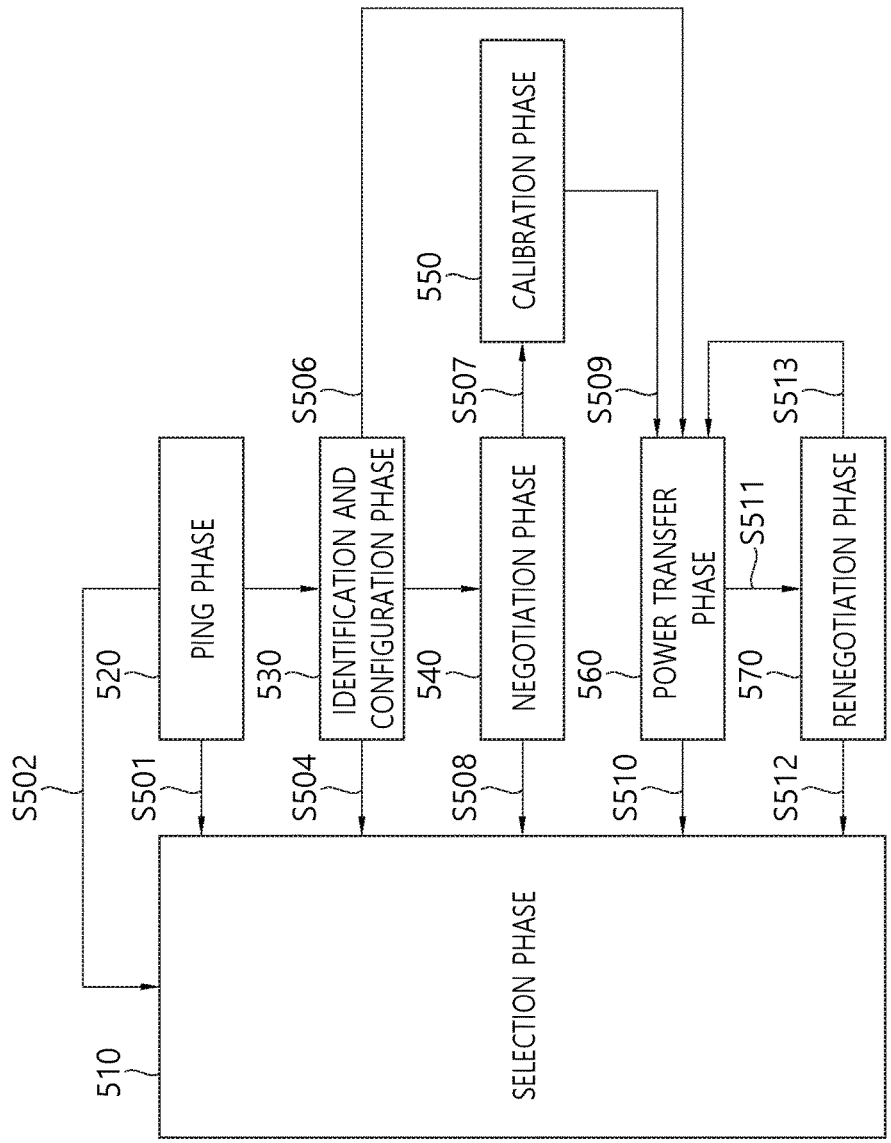
FIG. 5 is a state transition diagram for describing a wireless power transfer procedure.

FIG. 5 is a state transition diagram for describing a wireless power transfer procedure.

Referring to FIG. 5, the power transmission (or transfer) from the wireless power transmitter to the wireless power receiver according to an embodiment may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having an extremely short pulse and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transmission coil and/or resonance capacitor). According to the embodiment, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value-e.g., depending upon its type, purpose, characteristics, and so on, the wireless power receiver may have a low reference quality factor value-in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another embodiment, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet-from the receiver, the process may be shifted back to the selection phase (510). Additionally, in the ping phase (520), if the wireless power transmitter receives a signal indicating the completion of the power transfer-e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, this specification will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, this specification will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the embodiment may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that can be accommodated, and so on. And, the receiver status information may include information on the required power, and so on.

Figure 6:
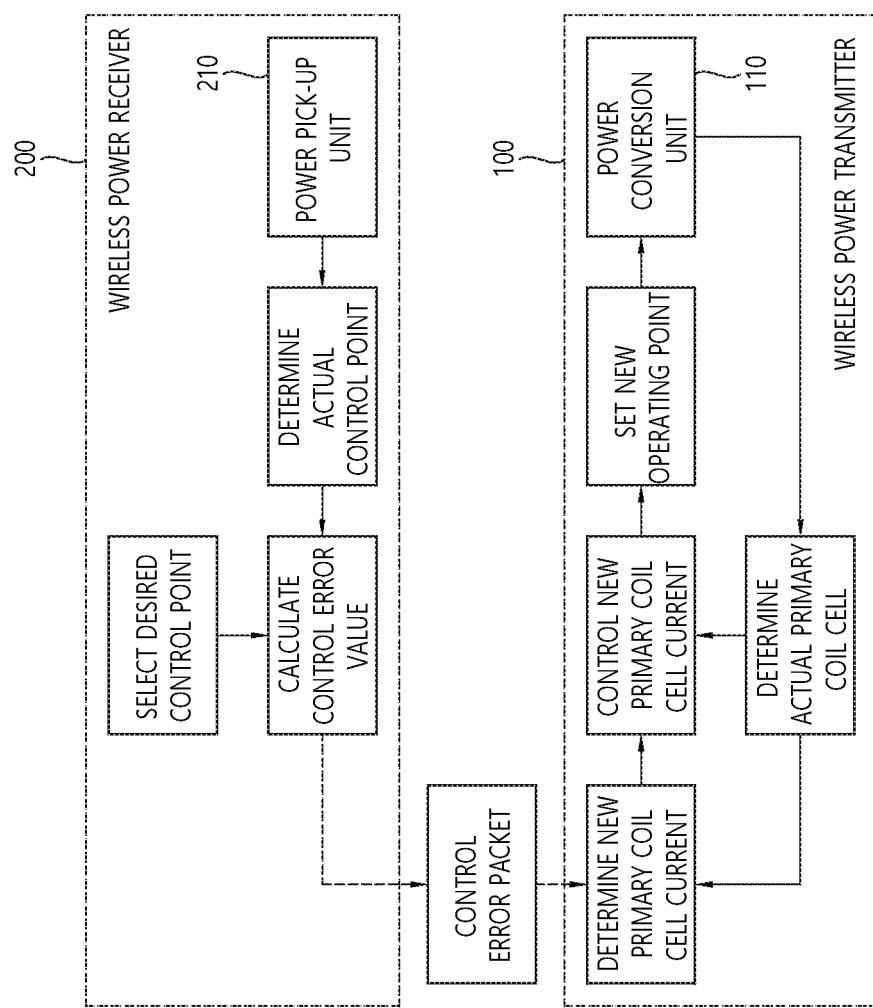
FIG. 6 shows a power control method according to an embodiment.

FIG. 6 shows a power control method according to an embodiment.

As shown in FIG. 6, in the power transfer phase (560), by alternating the power transmission and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operation point-amplitude, frequency, and duty cycle-by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to this specification, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
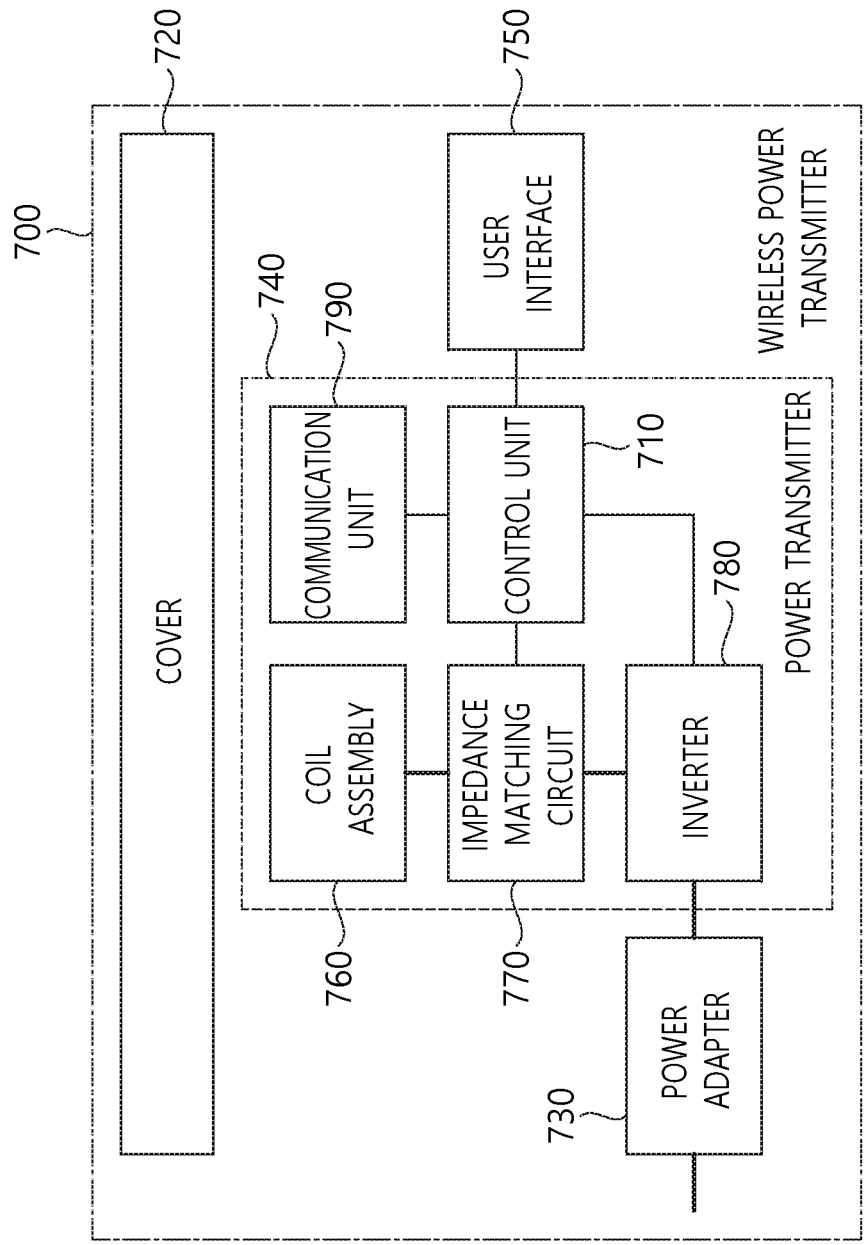
FIG. 7 is a block diagram of a wireless power transmitter according to another embodiment.

FIG. 7 is a block diagram of a wireless power transmitter according to another embodiment. This may belong to a wireless power transmission system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data can be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operation point. The operation point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
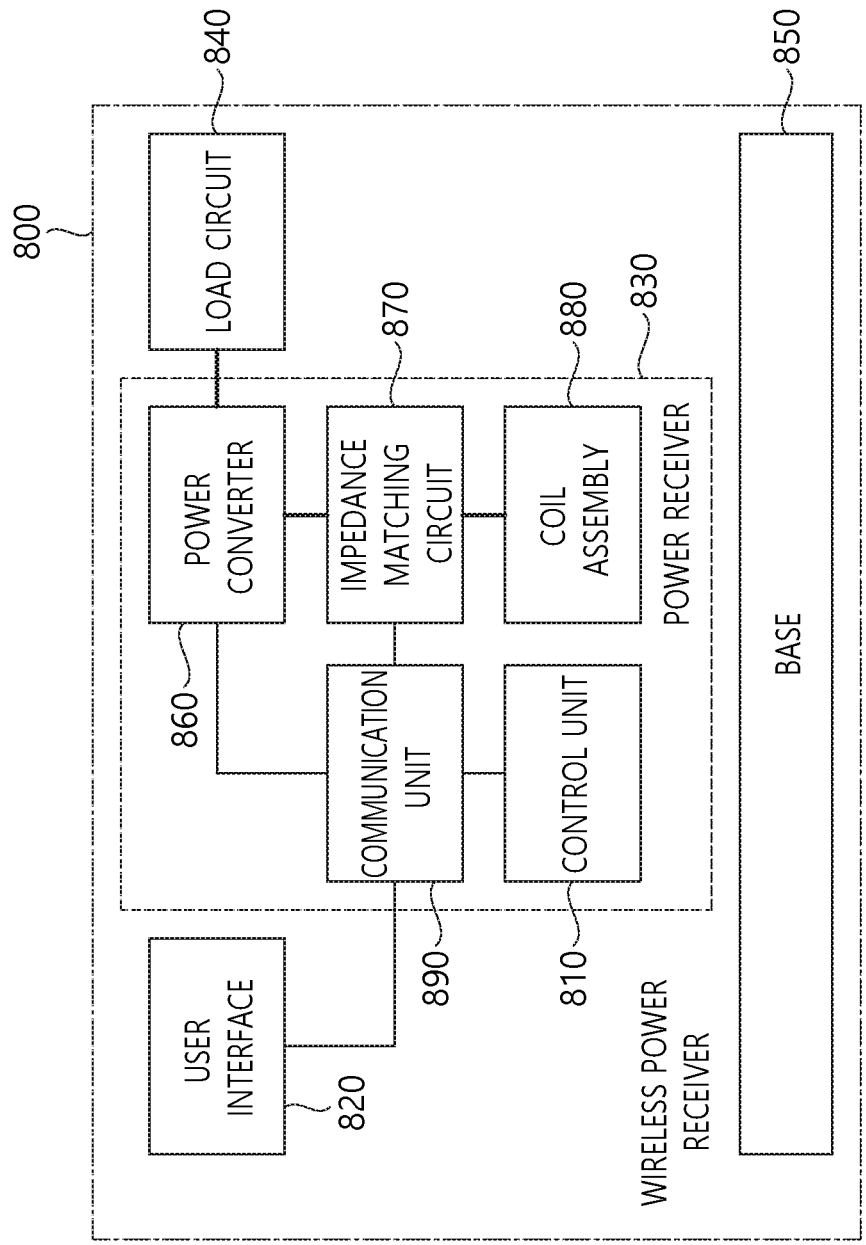
FIG. 8 shows a wireless power receiver according to another embodiment.

FIG. 8 shows a wireless power receiver according to another embodiment. This may belong to a wireless power transmission system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which can reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operation point and a desired operation point of the power receiver (830). Thereafter, by performing a request for adjusting the reflected impedance of the power transmitter and/or for adjusting an operation point of the power transmitter, the difference between the actual operation point and the desired operation point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
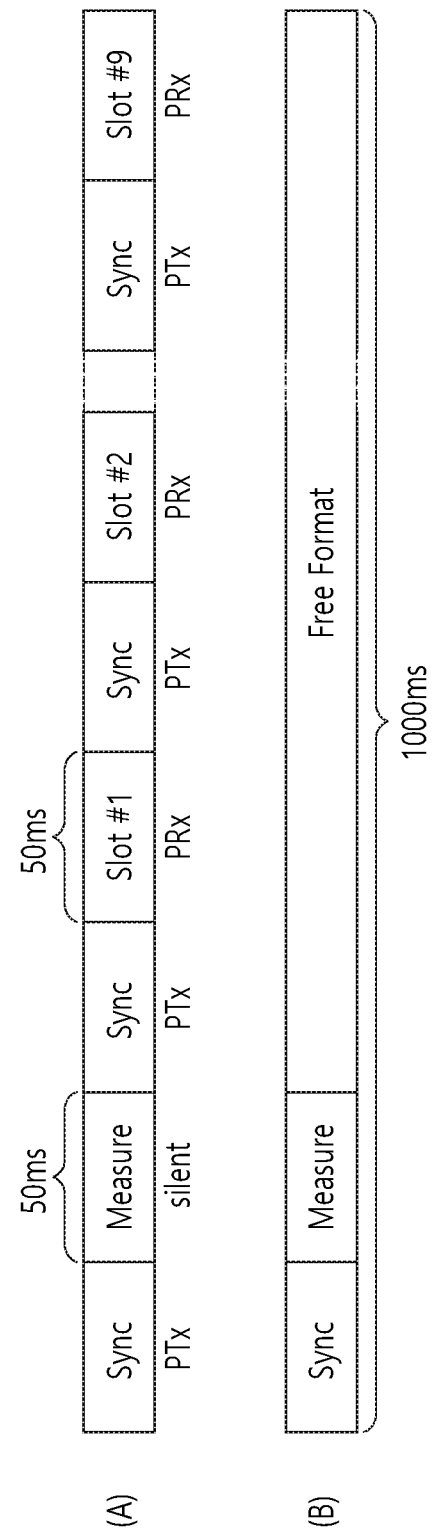
FIG. 9 shows a communication frame structure according to an embodiment.

FIG. 9 shows a communication frame structure according to an embodiment. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an embodiment.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern can be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10-not acknowledge (NAK)). And, in case the wireless power transmitter has confirmed the data packet, the response field may have a value of "11" (11-acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that can be freely used by a random wireless power receiver, the information field is given a value of '10'.

Figure 11:
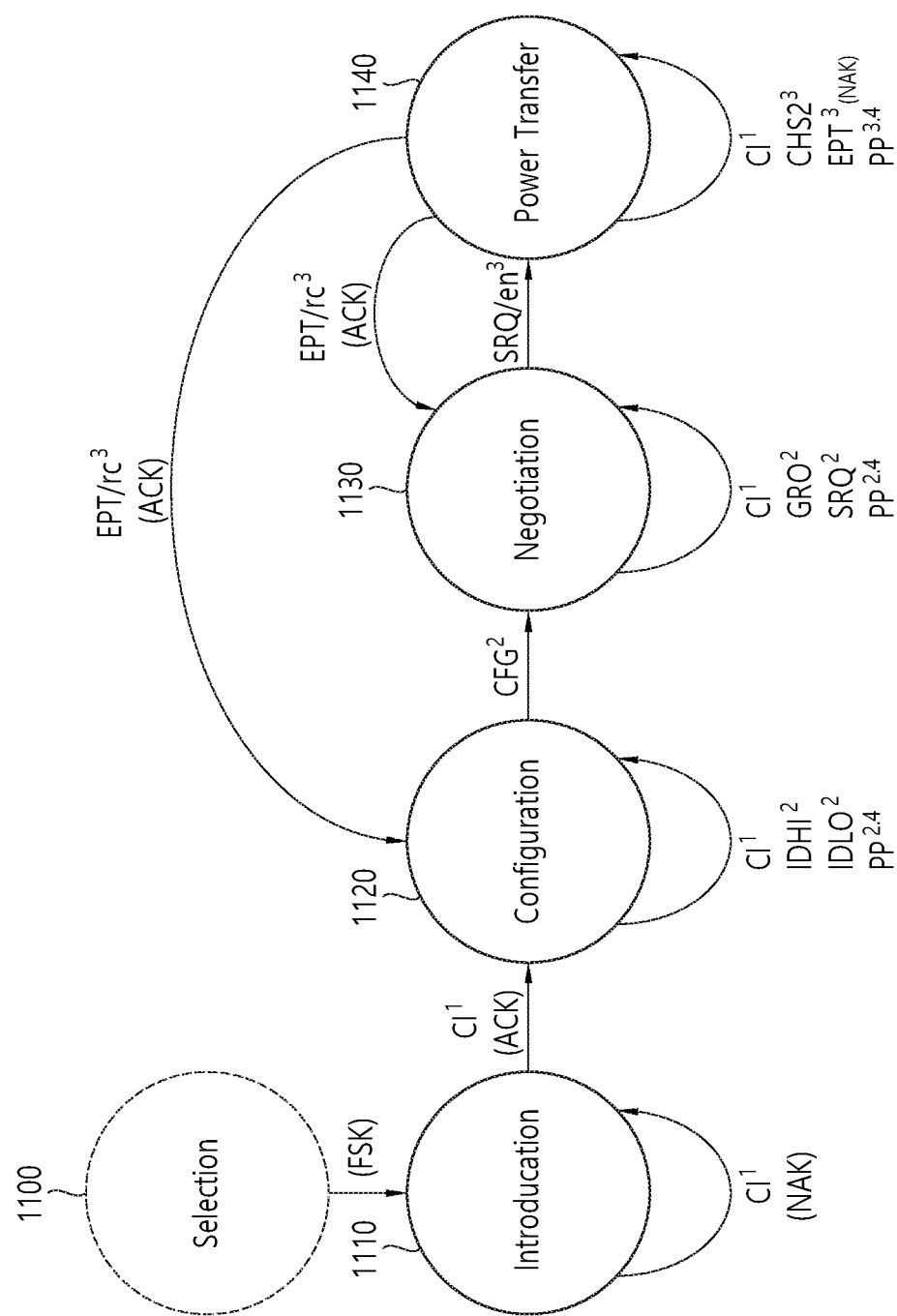
FIG. 11 shows operation statuses of a wireless power transmitter and a wireless power receiver in a shared mode according to an embodiment.

FIG. 11 shows operation statuses of a wireless power transmitter and a wireless power receiver in a shared mode according to an embodiment.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the embodiment may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power transmitter enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

In the wireless power transmission system, communication between a wireless power transmitter and receiver has been generally performed using amplitude shift keying (ASK) using a magnetic field change or frequency shift keying (FSK) using a frequency change. However, since the transfer rates of the ASK and the FSK are only a few kHz and are vulnerable to electrical and magnetic disturbances, the existing communication methods are not suitable for medium power transmission or large volume data transmission such as authentication, which is required in the advanced wireless power transmission system. In particular, the FSK scheme used for communication from the wireless power transmitter to the wireless power receiver provides a rate of about 200 bps or less at an operating frequency of 100 KHz, so there is a limit in digesting the increased amount of packets. Accordingly, in order to cover various applications of the wireless power transmission, there is a need for a wireless power transmitter, a receiver, and a method for supporting an improved communication speed.

The wireless power transmitter may change its operating frequency between a first operating frequency fmod in a modulated state and a second operating frequency fop in an unmodulated state. Indicating whether the difference between the first and second operating frequencies is negative or positive is referred to as polarity, and the magnitude of the difference between the first and second operating frequencies is referred to as depth. The polarity and depth are the FSK parameters required for FSK communication.

Figure 12:
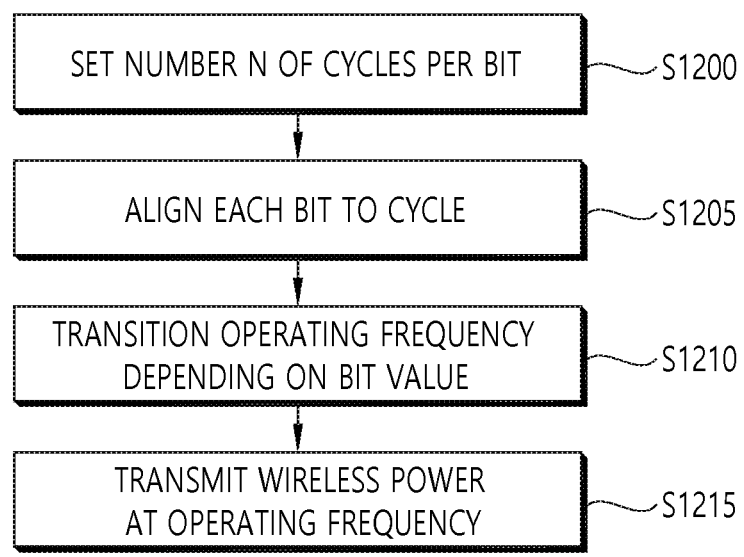
FIG. 12 is a flowchart illustrating a method for transmitting data and wireless power by a wireless power transmitter according to an embodiment.

FIG. 12 is a flowchart illustrating a method for transmitting data and wireless power by a wireless power transmitter according to an embodiment.

Referring to FIG. 12, the wireless power transmitter sets the number n of cycles (that is, the number of cycles per bit) used to transmit one bit at the operating frequency (S1200).

The operating frequency can be expressed in repeated cycles on the time axis. In this way, the number of cycles used to transmit one bit at the operating frequency is referred to as the number of cycles per bit. For example, n=512 means that 512 cycles are used to transmit one bit. In this case, the wireless power transmitter may modulate and/or encode successive data bits by aligning each bit to be transmitted to the wireless power receiver with 512 cycles of the operating frequency.

According to the present embodiment, the wireless power transmitter and/or the wireless power receiver may variably set or determine the number of cycles per bit. For example, the number of cycles per bit may be variously set like n=512, 256, 128, 64, 32, 16, 8, . . . When the number of cycles per bit is variably set as described above, the transfer rate of the FSK data may increase or decrease. For example, when n=512, if the transfer rate of the FSK data is x, and when n=128, the transfer rate of the FSK data is y, y=4x is established. That is, the transfer rate of the FSK data can increase by 4 times. This is because the smaller the number of cycles per bit, the more bits can be transmitted for the same cycle. The FSK modulation scheme that changes the number of cycles per bit provides improved data transfer rate and flexibility in communication control compared to the FSK modulation scheme that operates a fixed number of cycles per bit.

After all, since the number of cycles per bit is related to the communication speed, it may be called a modulation level or a modulation length from the modulation point of view. A low modulation level may mean that the number of cycles per bit is large, and a high modulation level may mean that the number of cycles per bit is small. For example, when the modulation level is expressed by 0 to 5, the correspondence between the modulation level and the number of cycles per bit is shown in Table 3.

TABLE 3

| Modulation level | Number of cycles per per |
|---|---|
| 0 (default) | 256 |
| 1 | 128 |
| 2 | 64 |
| 3 | 32 |
| 4 | 16 |
| 5 | 8 |

In Table 3, modulation level 0 may be defined as a default modulation level, for example. As an example, the default modulation level is defined as a basic modulation level used in a situation (for example, a situation where a communication error occurs, FOD detection, or an initial setup stage) where the high-reliability FSK transmission is required. Accordingly, in the situation where the high-reliability FSK transmission is not required, a higher modulation level providing a higher transfer rate than the default modulation level may be used. However, as the modulation level increases, one bit is represented by the smaller number of cycles, so the transfer rate may be more vulnerable to channel degradation.

The modulation level according to the present embodiment is adaptively changed in various situations, and may be set and applied. For example, the modulation level (or the number of cycles per bit) may change from 0 (256) to 2 (64), or from 3 (32) to 0 (256). Further, the diversification, change, and adaptive setting of the modulation level may depend on the encoding performance of the wireless power transmitter and/or the decoding performance of the wireless power receiver. For example, even if the wireless power transmitter supports the variable modulation level, the wireless power receiver may not support the variable modulation level.

The change, determination, setting, and the like of the modulation level according to the present embodiment may be performed in a part of the wireless power transmission process. For example, the change, determination, setting, and the like of the modulation level may be performed in a negotiation phase. In addition, the modulation level constitutes additional FSK parameters along with the polarity and depth, which are the FSK parameters.

Figure 13:
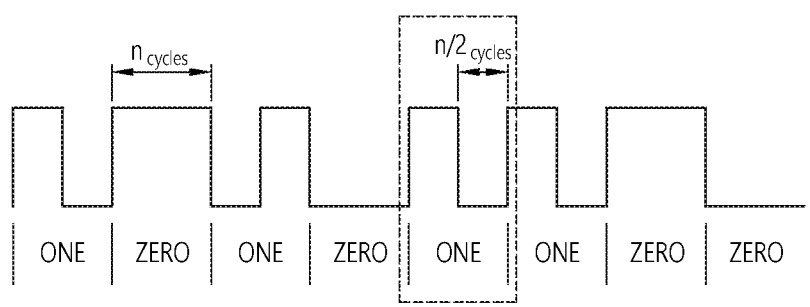
FIG. 13 is a diagram illustrating a process of encoding, by the wireless power transmitter, data based on FSK.

When the number n of cycles per bit according to the modulation level is determined (or set), the wireless power transmitter aligns each bit of data with n cycles (S1205). FIG. 13 is a diagram illustrating a process of encoding, by the wireless power transmitter, data based on the FSK. Referring to FIG. 13, the wireless power transmitter adjusts each bit (1, 0, 1, 0, 1, 1, 0, 0, . . . ) of data to a cycle of an operating frequency for transmitting data. That is, FIG. 13 illustrates that n cycles are used to transmit each bit at an operating frequency.

The wireless power transmitter transitions the operating frequency between differential bi-phases according to values of each bit for n cycles (S1210). This corresponds to the FSK modulation scheme. Here, the differential bi-phase includes first phase and a second phase that are different from each other in the operating frequency. That is, the operating frequency may transition from the first phase to the second phase, or may transition from the second phase to the first phase. Here, the first phase may be a modulated state, and the second phase may be an unmodulated state. Conversely, the first phase may be the unmodulated state, and the second phase may be the modulated state.

In a cycle in which a new bit is started, the transition of the operating frequency to the phase different from the previous phase may occur. For example, looking at the dotted box portion in FIG. 13, bit value 1 indicates that the operating frequency transitions from the first phase (low state) to the second phase (high state) in the start cycle and transitions from the second phase to the first phase at a n/2 cycle point. That is, if the bit value is 1, the phase transition of the operating frequency occurs twice for n cycles. On the other hand, the bit value 0 causes the operating frequency to transition only once within n cycles. The phase transition of the operating frequency that occurs twice for n cycles are mapped or corresponds to the bit value 1, and the phase transition of the operating frequency that occurs only once for n cycles is mapped or corresponds to the bit value 0.

Accordingly, the wireless power transmitter may encode the bit value 1 using the phase transition of the operating frequency that occurs twice for n cycles, and encode the bit value 0 using the phase transition of the operating frequency that occurs only once for n cycles. Conversely, the wireless power receiver may encode the bit value 1 when the phase transition of the operating frequency that occurs twice for n cycles is detected, and encode the bit value 0 when the phase transition of the operating frequency that occurs only once for n cycles is detected.

The wireless power transmitter transmits the wireless power to the wireless power receiver based on the magnetic coupling at the transitioned operating frequency (S1215). Since the FSK data is already contained in the phase in which the operating frequency is transitioned, the wireless power receiver may receive the FSK data together with the wireless power when the wireless power is transmitted at the operating frequency. This refers to in-band communication.

The wireless power transmitter according to the embodiments of FIGS. 12 and 13 corresponds to the wireless power transmission apparatus, the wireless power transmitter, or the power transmission unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of setting the number n of cycles per bit in step S1200, the operation of aligning each bit to a cycle in step S1205, and the operation of transitioning the operating frequency in step S1210 may be performed by the communication/control unit 120, and the operation of transmitting the wireless power at the operating frequency in step S1215 may be performed by the power conversion unit 110.

Figure 14:
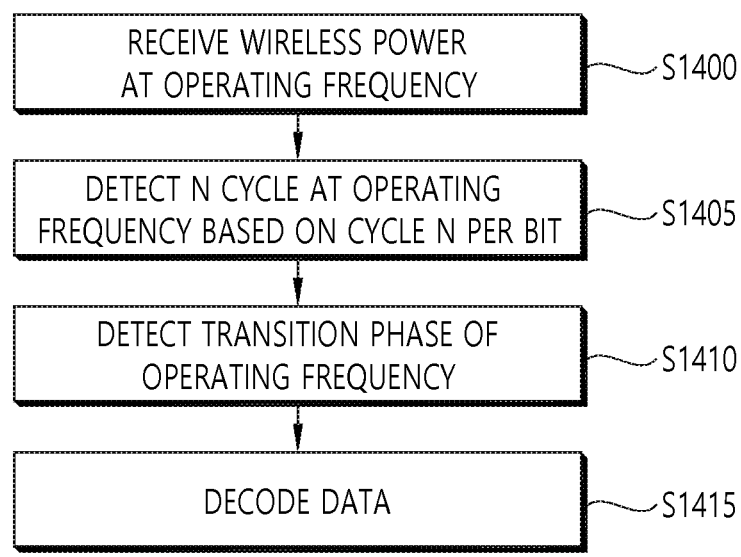
FIG. 14 is a flowchart illustrating a method for receiving data and wireless power by a wireless power receiver according to an embodiment.

FIG. 14 is a flowchart illustrating a method for receiving data and wireless power by the wireless power receiver according to an embodiment.

Referring to FIG. 14, the wireless power receiver receives the wireless power at the operating frequency from the wireless power transmitter (S1400).

The wireless power receiver detects n cycles that aligns each bit at the operating frequency based on the preset or indicated number n of cycles per bit (S1405). Here, the cycle n per bit may be determined in advance by the wireless power transmitter or may be determined in advance by the wireless power receiver. The wireless power receiver detects a series of bits every n cycles.

The wireless power receiver detects the transition phase of the operating frequency for n cycles (S1410). The transition phase of the operating frequency for n cycles informs the value of the bit corresponding to n cycles. This is as described in FIGS. 12 and 13.

The wireless power receiver decodes the data received from the wireless power transmitter based on the frequency transition phase (S1415).

The wireless power receiver according to the embodiment of FIG. 14 corresponds to the wireless power receiving apparatus, the wireless power receiver, or the power receiving unit disclosed in FIGS. 1 to 11. Accordingly, the operation of the wireless power receiver in the present embodiment is implemented by one or two or more combinations of each component of the wireless power receiver in FIGS. 1 to 11. For example, in the present embodiment, the operation of receiving the wireless power at the operating frequency in step S1400 may be performed by the power pickup unit 210. In addition, in the present embodiment, the operation of detecting n cycles at the operating frequency based on the cycle n per bit in step S1405, the operation of detecting the transition phase of the operating frequency in step S1410, the operation of decoding data in step S1415, and the like may be performed by the communication/control unit 220.

Hereinafter, a method for indicating whether a wireless power transmitter supports a variable modulation level is disclosed. The variable modulation level indicates that it is variable in terms of the modulation level, and may mean that the number of cycles per bit is variable.

The wireless power transmitter or receiver may or may not support the variable modulation level according to the standard version or a manufacturer. Whether the wireless power transmitter supports the variable modulation level may be indicated or signaled by a modulation level (ML) flag of a capability packet of the wireless power transmitter.

FIG. 15 illustrates a structure of a PTx capability packet of the wireless power transmitter according to an embodiment.

Referring to FIG. 15, the capability packet of the wireless power transmitter includes a power class field, a guaranteed power value field, a potential power value field, an ML flag, a WPID field, and a Not Res Sens field. For example, the ML flag is 1 bit, and the value 1 may indicate that the wireless power transmitter supports the variable modulation level, and the value 0 may indicate that the wireless power transmitter does not support the variable modulation level. If the wireless power transmitter does not support the variable modulation level, the number of cycles per bit may be fixed to 256 or 512, for example.

FIG. 16 illustrates the capability packet structure of the wireless power transmitter according to another embodiment.

Referring to FIG. 16, the capability packet of the wireless power transmitter includes a power class field, a guaranteed power value field, a potential power value field, an information field on the ML, a WPID field, and a Not Res Sens field. For example, the information field on ML is 3 bits, and the value indicates a modulation level as shown in Table 3. For example, if the information field on the ML is 000b, n=256 (default) may be indicated, and if the information field on the ML is 010b, n=64 may be indicated.

The wireless power transmitter may transmit the capability packet of the wireless power transmitter including the ML flag or the capability packet of the wireless power transmitter including the information field on the ML to the wireless power receiver. For example, the step of transmitting the capability packet of the wireless power transmitter may be performed in advance (that is, before step S1200) in the procedure of encoding and transmitting the FSK data depending on the determined modulation level according to FIG. 12.

Meanwhile, the wireless power receiver may receive the capability packet of the wireless power transmitter and check whether the wireless power transmitter supports the variable modulation level from the ML flag of the capability packet of the wireless power transmitter. Alternatively, the wireless power receiver may receive the capability packet of the wireless power transmitter and check which modulation level the wireless power transmitter requests from the information field on the ML of the capability packet of the wireless power transmitter.

For example, the step of receiving, by the wireless power receiver, the capability packet of the wireless power transmitter may be performed in advance (that is, before step S1400) in the procedure of receiving and decoding the FSK data depending on the modulation level according to FIG. 14.

In the following, a method for changing or determining a modulation level is disclosed.

Figure 17:
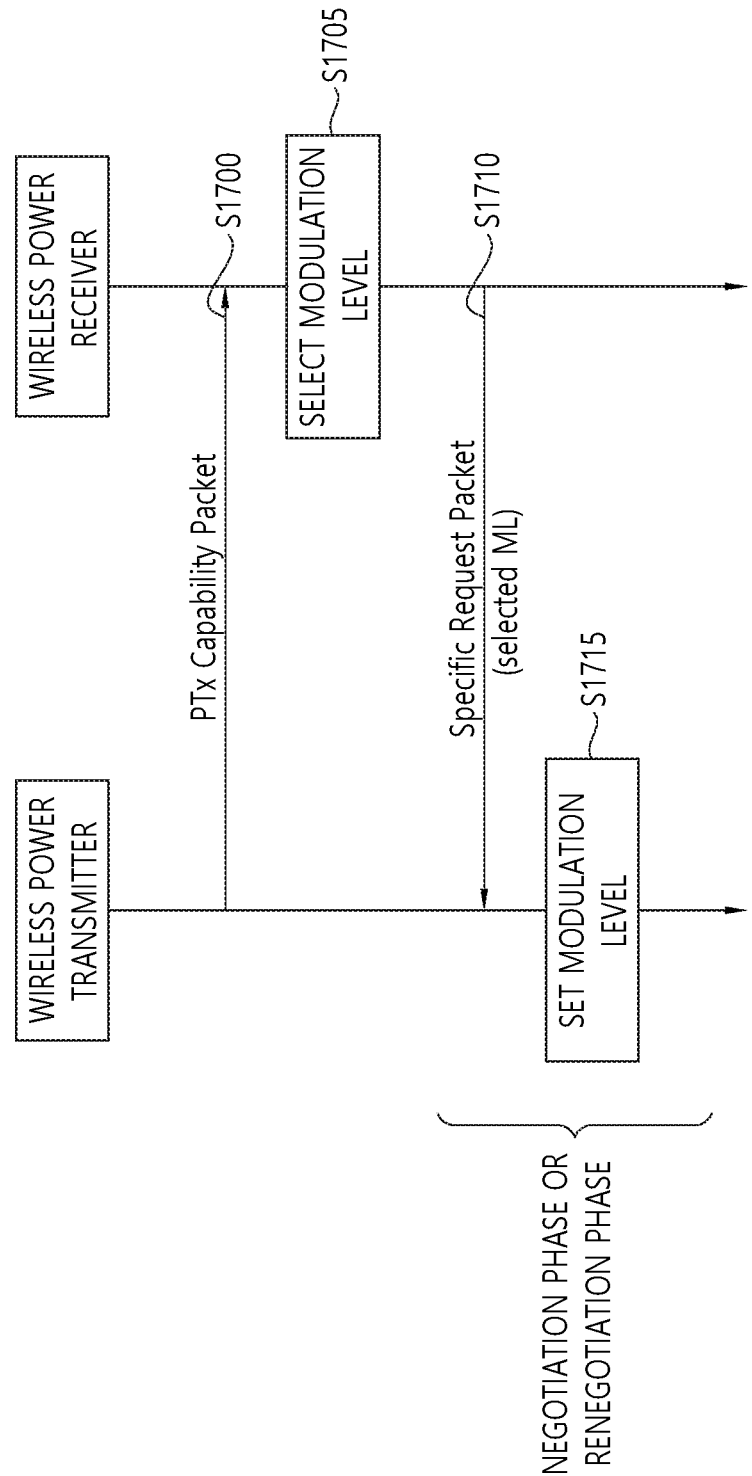
FIG. 17 is a flowchart illustrating a method for changing or determining a modulation level according to an embodiment.

FIG. 17 is a flowchart illustrating a method for changing or determining a modulation level according to an embodiment.

Referring to FIG. 17, in a negotiation or renegotiation phase, the wireless power transmitter transmits a PTx capability packet of the wireless power transmitter to the wireless power receiver (S1700). As an example, the capability packet of the wireless power transmitter includes the ML flag, and in this case, the structure of the capability packet of the wireless power transmitter is illustrated in FIG. 15. As another example, the capability packet of the wireless power transmitter includes the information field on the ML, and in this case, the structure of the capability packet of the wireless power transmitter is illustrated in FIG. 16.

When the ML flag indicates that the variable modulation level is supported or the information field on the ML indicates a specific modulation level, a possible specific modulation level is selected according to its own decoding performance (S1705).

The wireless power receiver transmits a specific request packet including a field indicating a modulation level selected by itself to the wireless power transmitter (S1710). As an example, a specific request packet including a field indicating a selected modulation level (selected ML) may include the structure of FIG. 18.

Figure 18:
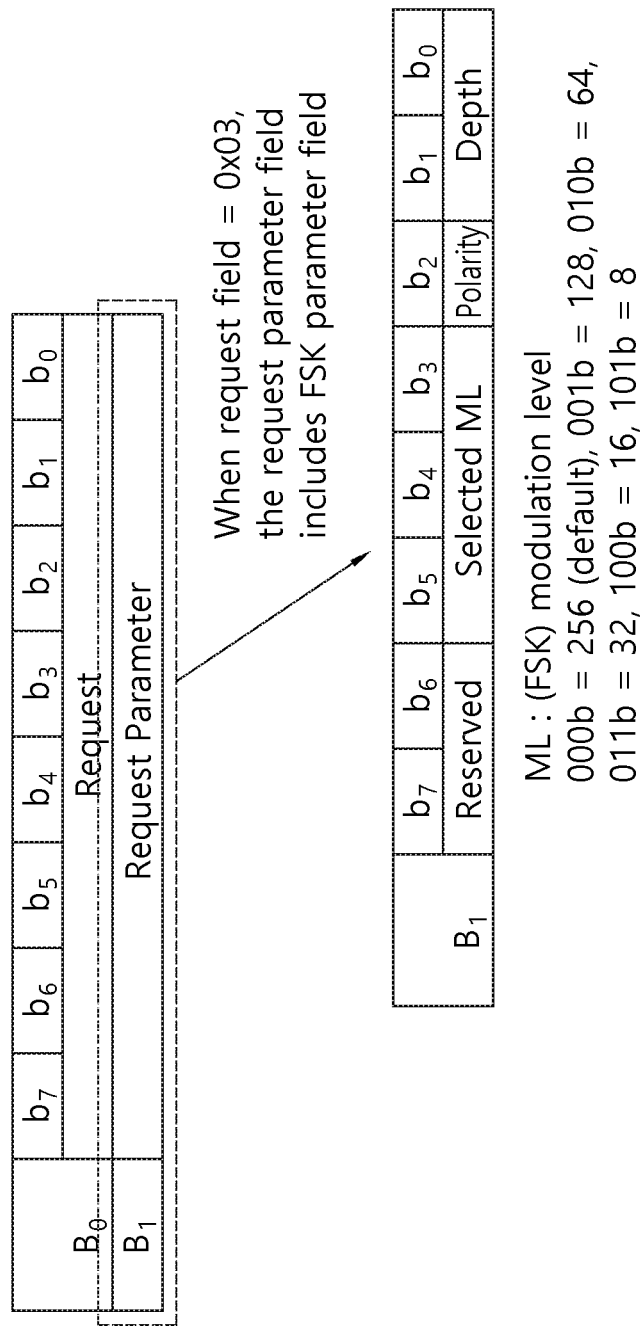
FIG. 18 is a diagram illustrating a structure of a specific request packet according to an embodiment.

FIG. 18 illustrates a structure of a specific request packet according to an embodiment.

Referring to FIG. 18, the specific request packet includes a 1-byte request field BO and a 1-byte request parameter field B 1. The request field indicates various matters to be requested to the wireless power transmitter as shown in Table 4.

TABLE 4

| Request | Description | Request Parameter |
| --- | --- | --- |
| 0x00 | End Negotiation | Change count |
| 0x01 | Guaranteed Power | Guaranteed Powr Value |
| 0x02 | Received Power Packet Type | Received Power Packet Header |
| 0x03 | FSK Parameters | Polarity and depth |
| 0x04 | Maximum Power | Maximum Power Value |
| 0x05 to 0xEF | Reserved | N.A. |
| 0xF0 to 0xFF | Proprietary | Proprietary |

Referring to Table 4, when the value of the request field is 0x03, it indicates that the request relates to the FSK parameter. In this case, the request parameter field of the request packet includes the FSK parameter field. The FSK parameter field includes a reserved field, a 3-bit information field on the selected ML, a polarity field, and a depth field. The selected information field on the ML may be smaller than 3 bits or more.

Referring back to FIG. 17, the wireless power transmitter changes and sets the modulation level to the modulation level selected by the wireless power receiver (S1710). Thereafter, the method for transmitting/receiving data and wireless power according to FIGS. 12 to 14 may be performed.

The wireless power transmitter according to the embodiment of FIG. 17 corresponds to the wireless power transmission apparatus, the wireless power transmitter, or the power transmission unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of the wireless power transmitter according to steps S1700 and S1710 may be performed by the communication/control unit 120.

Meanwhile, the wireless power receiver according to the embodiment of FIG. 17 corresponds to the wireless power receiving apparatus, the wireless power receiver, or the power receiving unit disclosed in FIGS. 1 to 11. Accordingly, the operation of the wireless power receiver in the present embodiment is implemented by one or two or more combinations of each component of the wireless power receiver in FIGS. 1 to 11. For example, in the present embodiment, the operation of the wireless power transmitter according to steps S1700 and S1710 may be performed by the communication/control unit 220.

Figure 19:
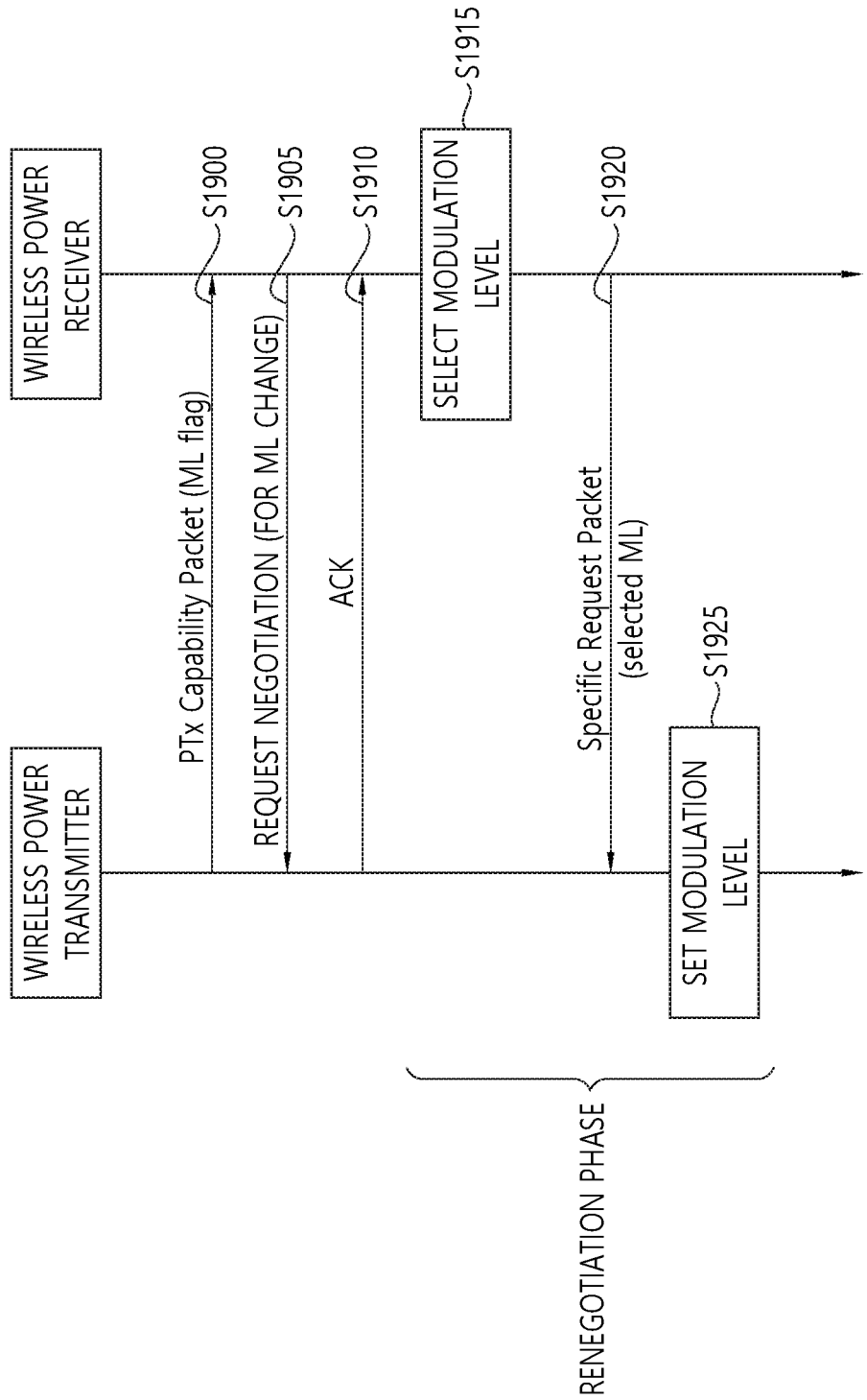
FIG. 19 is a flowchart illustrating a method for changing or determining a modulation level according to another embodiment.

FIG. 19 is a flowchart illustrating a method for changing or determining a modulation level according to another embodiment.

Referring to FIG. 19, it is assumed that the wireless power transmitter performs the FSK data transmission and the wireless power transmission at a specific modulation level (for example, a default modulation level). In the negotiation phase, the wireless power receiver receives a PTx capability packet of the wireless power transmitter including the ML flag (S1900). When the ML flag indicates that the wireless power transmitter supports the variable modulation level, the wireless power receiver determines whether the modulation level with high quality of the FSK channel is possible. If the quality of the current FSK channel is very clean and there is no noise (that is, if the quality of the FSK channel is equal to or greater than a threshold), the wireless power receiver transmits a renegotiation request packet for changing the modulation level to the wireless power transmitter (S1905). The wireless power transmitter responds to an ACK (S1910), and the wireless power transmitter and receiver enter the renegotiation phase. At this time, the ACK is generated and transmitted according to the default modulation level.

The wireless power receiver selects a possible modulation level and transmits a specific request packet (0x20) including information on the selected modulation level to the wireless power transmitter (S1915). As an example, the specific request packet may include the specific request packet of FIG. 18.

When the specific request packet is successfully transmitted and the renegotiation phase is normally terminated, the wireless power transmitter changes and sets the existing default modulation level to the selected modulation level (S1920).

The wireless power transmitter according to the embodiment of FIG. 19 corresponds to the wireless power transmission apparatus, the wireless power transmitter, or the power transmission unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of the wireless power transmitter according to steps S1900 to S1920 may be performed by the communication/control unit 120.

Meanwhile, the wireless power receiver according to the embodiment of FIG. 19 corresponds to the wireless power receiving apparatus, the wireless power receiver, or the power receiving unit disclosed in FIGS. 1 to 11. Accordingly, the operation of the wireless power receiver in the present embodiment is implemented by one or two or more combinations of each component of the wireless power receiver in FIGS. 1 to 11. For example, in the present embodiment, the operation of the wireless power transmitter according to steps S1900 to S1920 may be performed by the communication/control unit 220.

Figure 20:
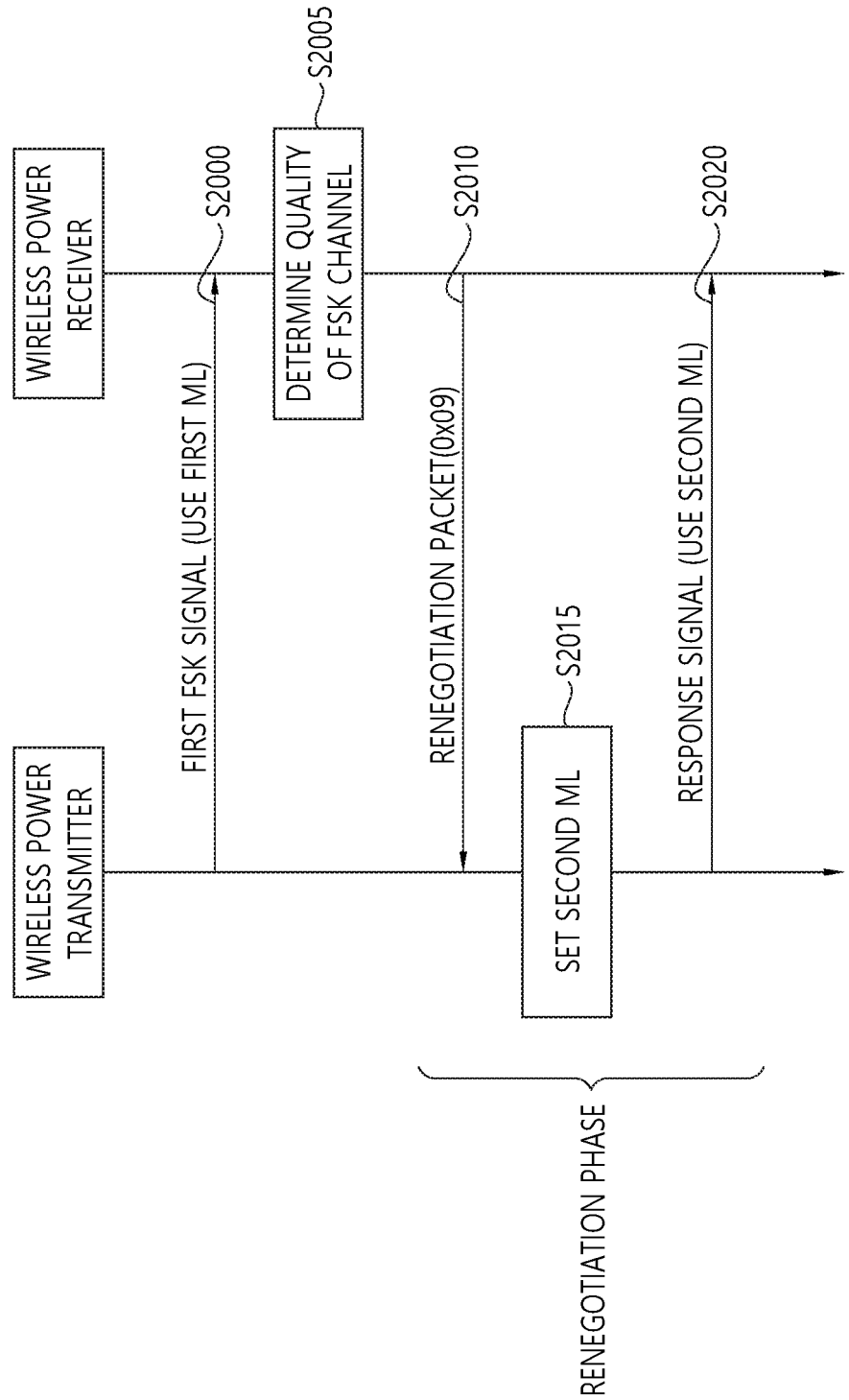
FIG. 20 is a flowchart illustrating a method for changing or determining a modulation level according to another embodiment.

FIG. 20 is a flowchart illustrating a method for changing or determining a modulation level according to another embodiment.

Referring to FIG. 20, the wireless power transmitter or receiver may change or determine the modulation level based on the quality of the FSK channel (data or signal). Specifically, since the object receiving the FSK data is the wireless power receiver, the wireless power receiver may measure or determine the quality of the FSK channel. Thus, the wireless power receiver may trigger the change in the modulation level.

Figure 21:
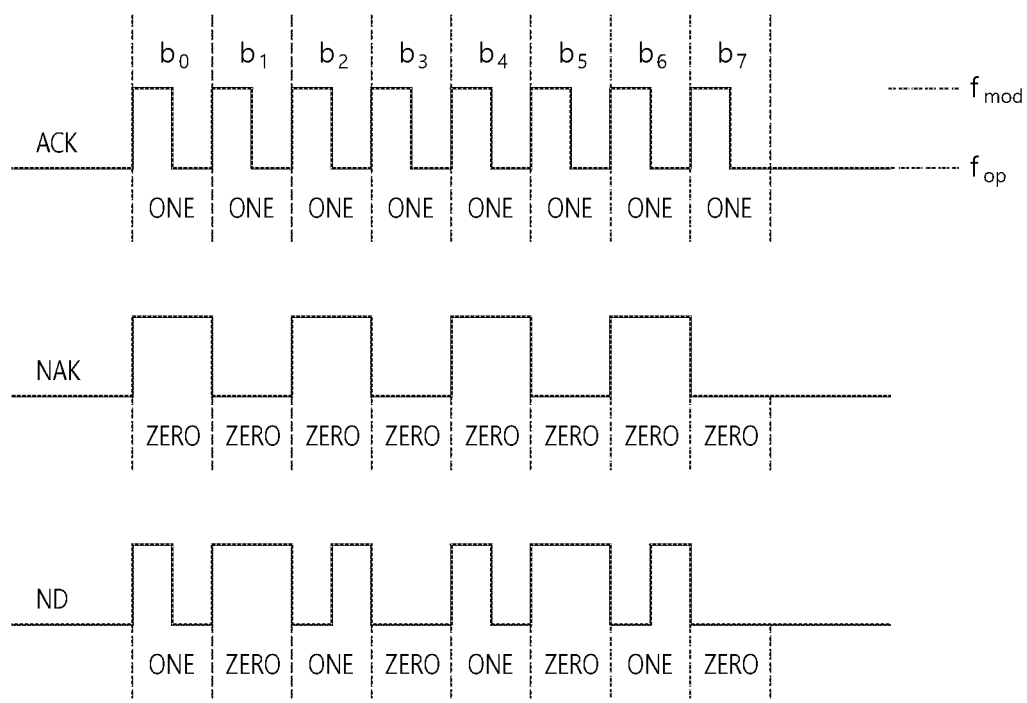
FIG. 21 is a diagram illustrating a bit pattern response such as ACK or NACK.

The wireless power receiver receives a first FSK signal using the first modulation level (ML) in a power transfer phase (S2000). As an example, the first FSK signal may be a response signal of the wireless power transmitter to a received power packet (RPP) transmitted from the wireless power receiver to the wireless power transmitter. Here, the response signal is a bit pattern such as ACK or NACK, and may be, for example, as illustrated in FIG. 21. The wireless power receiver sets the RPP mode value to '000' and expects to receive the ACK or NACK for the RPP.

The wireless power receiver may determine the quality of the FSK channel based on the reception rate of the first FSK signal (S2005). If the reception quality of the first FSK signal is less than a certain criterion (or when an error occurs in the first FSK signal), the wireless power receiver may determine that there is no received signal. In this case, the wireless power receiver can enter the resetting phase of the modulation level. As an example, the entry into the modulation level resetting step may include a step (S2010) of transmitting, by the wireless power receiver, a renegotiation packet (0x09) for changing the modulation level to the wireless power transmitter.

Since the quality of the FSK channel is degraded, the wireless power transmitter changes to a second modulation level (ML) that is more robust to channel errors and is lower than the first modulation level (S2015), and transmits the response signal to the renegotiation packet based on the second modulation level (S2020). Here, the second modulation level may be a default modulation level (for example, n=256, or modulation level=0). Accordingly, even if the channel environment changes, the possibility of mutual communication may be guaranteed.

The wireless power transmitter according to the embodiment of FIG. 20 corresponds to the wireless power transmission apparatus, the wireless power transmitter, or the power transmission unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of the wireless power transmitter according to steps S2000 to S2020 may be performed by the communication/control unit 120.

Meanwhile, the wireless power receiver according to the embodiment of FIG. 19 corresponds to the wireless power receiving apparatus, the wireless power receiver, or the power receiving unit disclosed in FIGS. 1 to 11. Accordingly, the operation of the wireless power receiver in the present embodiment is implemented by one or two or more combinations of each component of the wireless power receiver in FIGS. 1 to 11. For example, in the present embodiment, the operation of the wireless power transmitter according to steps S2000 to S2020 may be performed by the communication/control unit 220.

In one aspect, the present embodiment describes an embodiment in which different modulation levels are selectively applied to the FSK signal (FSK data) for which the high reliability should be guaranteed, and the FSK signal (or FSK data) for which the high reliability should not be guaranteed. For example, the FSK signal (FSK data) for which the high reliability should be guaranteed includes a response signal (i.e. bit pattern) to the packet received from the wireless power receiver. The FSK signal (FSK data) for which the high reliability should not be guaranteed may include a data transport stream transmitted by the wireless power transmitter. In this case, the default modulation level is applied to the FSK signal (or FSK data) for which the high reliability should be guaranteed, and the modulation level (wireless power receiver) higher than the default modulation level may be applied to the FSK signal (or FSK data) for which the high reliability should not be guaranteed.

In another aspect, the present embodiment includes an embodiment in which different modulation levels are differentially applied to each phase of power transmission. For example, in an initial phase (ping phase and setup phase) or a negotiation phase and a renegotiation phase, the FSK modulation level may be collectively set as the default modulation level so that high reliability can be guaranteed. Also, in the power transmission phase, the FSK modulation level may be set to a higher modulation level (selected by the wireless power receiver) than the default modulation level so that high-speed data transmission can be guaranteed.

In a wireless power transmitting method and device or receiving device and method according to embodiments of this specification, because all components or steps are not essential, the wireless power transmitting device and method or receiving device and method may be performed by including some or all of the above-described components or steps. Further, embodiments of the wireless power transmitting device and method or receiving device and method may be performed in combination. Further, it is not necessary that the above components or steps should be performed in the described order, and a step described later may be performed prior to a step described earlier.

The foregoing description is merely illustrative of the technical idea of this specification, and various changes and modifications may be made by those skilled in the art without departing from the essential characteristics of this specification. Therefore, the foregoing embodiments of this specification can be implemented separately or in combination.

Therefore, the embodiments disclosed in this specification are intended to illustrate rather than to limit the scope of this specification, and the scope of the technical idea of this specification is not limited by these embodiments. The scope of protection of this specification should be construed according to the following claims, and all technical ideas within the scope of equivalents to claims should be construed as falling within the scope of this specification.

What is claimed is:

1. A method for transmitting data and wireless power by a wireless power transmitter, comprising:
generating the wireless power at an operating frequency;
setting the number n of cycles per bit used to transmit one bit at the operating frequency;
aligning each bit of the data to the n cycles;
transitioning the operating frequency between differential bi-phases depending on values of each bit for the n cycles; and
transmitting the wireless power to a wireless power receiver based on magnetic coupling at the transitioned operating frequency.

2. The method of claim 1, wherein the number of cycles per unit bit is variably set based on a modulation level.

3. The method of claim 2, wherein the number of cycles per unit bit decreases based on the increase in the modulation level.

4. The method of claim 1, wherein the number of cycles per unit bit or the modulation level is set in a negotiation phase related to the transmission of the wireless power.

5. The method of claim 2, wherein the information on the modulation level is included in a capability packet of the wireless power transmitter and transmitted to the wireless power receiver.

6. The method of claim 5, wherein the capability packet of the wireless power transmitter is transmitted as a response to a request packet of the wireless power receiver.

7. The method of claim 6, wherein the request packet of the wireless power receiver includes information on a modulation level selected by the wireless power receiver.

8. The method of claim 1, wherein the modulation level or the number of cycles per unit bit is defined as a default.

9. A wireless power transmitter transmitting data and wireless power, comprising:
a power conversion unit that generates the wireless power at an operating frequency and transmits the generated wireless power to a wireless power receiver based on magnetic coupling; and
a communication/control unit that sets the number n of cycles per bit used to transmit one bit at the operating frequency, aligns each bit of the data to n cycles, and transitions the operating frequency between differential bi-phases depending on values of each bit for the n cycles.

10. The wireless power transmitter of claim 9, wherein the number of cycles per unit bit is variably set based on a modulation level.

11. The wireless power transmitter of claim 10, wherein the number of cycles per unit bit decreases based on the increase in the modulation level.

12. The wireless power transmitter of claim 10, wherein the number of cycles per unit bit or the modulation level is set in a negotiation phase related to the transmission of the wireless power.

13. The wireless power transmitter of claim 10, wherein the communication/control unit transmits information on the modulation level to the wireless power receiver by including the information on the modulation level in a capability packet of the wireless power transmitter.

14. The wireless power transmitter of claim 13, wherein the communication/control unit transmits the capability packet of the wireless power transmitter as a response to a request packet of the wireless power receiver.

15. A wireless power receiver receiving data and wireless power, comprising:
a power pick-up unit that receives the wireless power from a wireless power transmitter at an operating frequency; and
a communication/control unit that detects n cycles aligning each bit at the operating frequency based on the number n of cycles per bit negotiated with the wireless power transmitter in advance, detects a transition phase of the operating frequency for the n cycles, and decodes data received from the wireless power transmitter based on the transition phase of the operating frequency.

* * * * *